USO11195173B2

(12) United States Patent
Enright et al.

(10) Patent No.: US 11,195,173 B2
(45) Date of Patent: Dec. 7, 2021

(54) AUTHENTICATION TO AUTHORIZATION BRIDGE USING ENRICHED MESSAGES

(71) Applicant: CardinalCommerce Corporation, Mentor, OH (US)

(72) Inventors: Erik Nils Enright, Willoughby Hills, OH (US); Adam Ratica, Mentor, OH (US); Michael A. Keresman, III, Kirtland Hills, OH (US); Francis M. Sherwin, Shaker Heights, OH (US); Chandra S. Balasubramanian, University Heights, OH (US)

(73) Assignee: CardinalCommerce Corporation, Mentor, OH (US)

( * ) Notice: Subject to any disclaimer, the term of this patent is extended or adjusted under 35 U.S.C. 154(b) by 770 days.

(21) Appl. No.: 15/650,510

(22) Filed: Jul. 14, 2017

(65) Prior Publication Data

US 2018/0018662 A1 Jan. 18, 2018

Related U.S. Application Data

(60) Provisional application No. 62/362,876, filed on Jul. 15, 2016.

(51) Int. Cl.
*G06Q 20/38* (2012.01)
*H04L 9/32* (2006.01)
*G06Q 20/40* (2012.01)

(52) U.S. Cl.
CPC ..... *G06Q 20/3829* (2013.01); *G06Q 20/4018* (2013.01); *H04L 9/3228* (2013.01); *H04L 2209/56* (2013.01)

(58) Field of Classification Search
CPC ............ G06Q 20/3829; G06Q 20/4018; H04L 9/3228; H04L 2209/56
See application file for complete search history.

(56) References Cited

U.S. PATENT DOCUMENTS 3,806,874 A 4/1974 Ehrat
4,720,860 A 1/1988 Weiss
(Continued)

FOREIGN PATENT DOCUMENTS

CN 13338092 A 2/2002
CN 1926567 A 3/2007
(Continued)

OTHER PUBLICATIONS

B.B. Zaidan, A.A. Zaidan, A.K. Al-Frajatand H.A. Jalab, 2010. On the Differences between Hiding Information and Cryptography Techniques: An Overview. Journal of Applied Sciences, 10: 1650-1655. (Year: 2010).*

(Continued)

*Primary Examiner* — Patrick McAtee
*Assistant Examiner* — Terry Nathan Murray
(74) *Attorney, Agent, or Firm* — The Webb Law Firm

(57) ABSTRACT

A system of electronic communication is disclosed. The system may: create a Pre-Authentication Transaction Number (Pre-ATN) by combining a number with a Special Encode Value (SEV), wherein the SEV is a single digit integer value; encrypt the Pre-ATN using a Format Preserving Encryption (FPE) to generate an encrypted Authentication Transaction Number (ATN); and send the encrypted ATN to an access control server (ACS) to use the encrypted ATN to generate a cardholder Authentication Verification Value (CAVV) or an Accountholder Authentication Value (AAV).

9 Claims, 4 Drawing Sheets

(56) References Cited

U.S. PATENT DOCUMENTS

| | | |
|---|---|---|
| 4,747,050 A | 5/1988 | Brachtl et al. |
| 4,799,156 A | 1/1989 | Shavit et al. |
| 4,800,590 A | 1/1989 | Vaughan |
| 4,885,778 A | 12/1989 | Weiss |
| 5,168,520 A | 12/1992 | Weiss |
| 5,233,655 A | 8/1993 | Shapiro |
| 5,237,614 A | 8/1993 | Weiss |
| 5,251,259 A | 10/1993 | Mosley |
| 5,317,636 A | 5/1994 | Vizcaino |
| 5,361,062 A | 11/1994 | Weiss et al. |
| 5,450,491 A | 9/1995 | McNair |
| 5,478,994 A | 12/1995 | Rahman et al. |
| 5,479,512 A | 12/1995 | Weiss |
| 5,485,519 A | 1/1996 | Weiss |
| 5,490,251 A | 2/1996 | Clark et al. |
| 5,491,752 A | 2/1996 | Kaufman et al. |
| 5,513,272 A | 4/1996 | Bogosian, Jr. |
| 5,544,246 A | 8/1996 | Mandelbaum et al. |
| 5,557,518 A | 9/1996 | Rosen |
| 5,590,038 A | 12/1996 | Pitroda |
| 5,590,197 A | 12/1996 | Chen et al. |
| 5,627,355 A | 5/1997 | Rahman et al. |
| 5,657,388 A | 8/1997 | Weiss |
| 5,671,279 A | 9/1997 | Elgamal |
| 5,715,314 A | 2/1998 | Payne et al. |
| 5,742,684 A | 4/1998 | Labaton et al. |
| 5,757,917 A | 5/1998 | Rose et al. |
| 5,761,306 A | 6/1998 | Lewis |
| 5,781,632 A | 7/1998 | Odom |
| 5,790,667 A | 8/1998 | Omori et al. |
| 5,790,677 A | 8/1998 | Fox et al. |
| 5,809,144 A | 9/1998 | Sirbu et al. |
| 5,815,665 A | 9/1998 | Teper et al. |
| 5,825,881 A | 10/1998 | Colvin, Sr. |
| 5,826,245 A | 10/1998 | Sandberg-Diment |
| 5,884,271 A | 3/1999 | Pitroda |
| 5,884,288 A | 3/1999 | Chang et al. |
| 5,887,065 A | 3/1999 | Audebert |
| 5,909,492 A | 6/1999 | Payne et al. |
| 5,913,203 A | 6/1999 | Wong et al. |
| 5,917,913 A * | 6/1999 | Wang ................ G06Q 20/401 235/380 |
| 5,937,068 A | 8/1999 | Audebert |
| 5,937,394 A | 8/1999 | Wong et al. |
| 5,956,699 A | 9/1999 | Wong et al. |
| 5,988,497 A | 11/1999 | Wallace |
| 5,991,411 A | 11/1999 | Kaufman et al. |
| 5,991,413 A | 11/1999 | Arditti et al. |
| 5,995,626 A * | 11/1999 | Nishioka .............. G06Q 20/02 380/30 |
| 5,999,624 A | 12/1999 | Hopkins |
| 5,999,626 A | 12/1999 | Mullin et al. |
| 6,005,939 A | 12/1999 | Fortenberry et al. |
| 6,014,650 A | 1/2000 | Zampese |
| 6,018,724 A | 1/2000 | Arent |
| 6,026,166 A | 2/2000 | Lebourgeois |
| 6,029,150 A | 2/2000 | Kravitz |
| 6,070,150 A | 5/2000 | Remington et al. |
| 6,092,053 A | 7/2000 | Boesch et al. |
| 6,269,099 B1 * | 7/2001 | Borella .............. H04L 12/4604 370/389 |
| 6,270,011 B1 | 8/2001 | Gottfried |
| 6,272,492 B1 | 8/2001 | Kay |
| 6,327,578 B1 | 12/2001 | Linehan |
| 6,366,893 B2 | 4/2002 | Hannula et al. |
| 6,519,571 B1 | 2/2003 | Guheen et al. |
| 6,529,886 B1 | 3/2003 | Campana et al. |
| 6,557,759 B1 | 5/2003 | Zolotarev et al. |
| 6,560,581 B1 | 5/2003 | Fox et al. |
| 6,675,153 B1 | 1/2004 | Cook et al. |
| 6,751,735 B1 * | 6/2004 | Schell ................ G06F 21/602 380/277 |
| 7,003,480 B2 | 2/2006 | Fox et al. |
| 7,003,789 B1 | 2/2006 | Linehan |
| 7,051,002 B2 | 5/2006 | Keresman, III et al. |
| 7,058,611 B2 | 6/2006 | Kranzley et al. |
| 7,089,208 B1 | 8/2006 | Levchin et al. |
| 7,111,789 B2 | 9/2006 | Rajasekaran et al. |
| 7,120,609 B1 | 10/2006 | Kerkdijk |
| 7,133,645 B2 | 11/2006 | Thermond |
| 7,133,843 B2 | 11/2006 | Hansmann et al. |
| 7,133,846 B1 | 11/2006 | Ginter et al. |
| 7,191,151 B1 | 3/2007 | Nosek |
| 7,237,117 B2 | 6/2007 | Weiss |
| 7,249,094 B2 | 7/2007 | Levchin et al. |
| 7,349,557 B2 | 3/2008 | Tibor |
| 7,469,341 B2 | 12/2008 | Edgett et al. |
| 7,499,889 B2 | 3/2009 | Golan et al. |
| 7,546,944 B2 | 6/2009 | Goldberg et al. |
| 7,647,252 B2 | 1/2010 | Rampell et al. |
| 7,693,783 B2 | 4/2010 | Balasubramanian et al. |
| 7,707,120 B2 | 4/2010 | Dominguez et al. |
| 7,788,139 B2 | 8/2010 | Rampell et al. |
| 7,801,825 B2 | 9/2010 | Kranzley et al. |
| 7,966,259 B1 | 6/2011 | Bui |
| 7,996,324 B2 | 8/2011 | Bishop et al. |
| 8,140,429 B2 | 3/2012 | Balasubramanian et al. |
| H2270 H * | 6/2012 | Le Saint .................. 713/168 |
| 8,271,395 B2 | 9/2012 | Dominguez et al. |
| 8,396,810 B1 | 3/2013 | Cook |
| 8,966,268 B2 | 2/2015 | Marien |
| 9,990,622 B2 | 6/2018 | Choi et al. |
| 10,373,138 B2 | 8/2019 | Hammad |
| 10,521,794 B2 | 12/2019 | Dimmick |
| 2001/0011256 A1 | 8/2001 | Hannula et al. |
| 2001/0032878 A1 | 10/2001 | TSiounis |
| 2001/0047334 A1 | 11/2001 | Nappe et al. |
| 2002/0032616 A1 | 3/2002 | Suzuki et al. |
| 2002/0042776 A1 | 4/2002 | Woo et al. |
| 2002/0042781 A1 | 4/2002 | Kranzley et al. |
| 2002/0103752 A1 | 8/2002 | Berger et al. |
| 2003/0093372 A1 | 5/2003 | Atogi et al. |
| 2003/0130958 A1 | 7/2003 | Narayanan et al. |
| 2003/0009382 A1 | 9/2003 | Rajasekaran et al. |
| 2003/0200172 A1 | 10/2003 | Randle et al. |
| 2003/0233327 A1 | 12/2003 | Keresman, III et al. |
| 2004/0002918 A1 | 1/2004 | McCarthy et al. |
| 2004/0078328 A1 | 4/2004 | Talbert et al. |
| 2005/0164739 A1 | 7/2005 | Goldberg et al. |
| 2005/0177750 A1 | 8/2005 | Gasparini et al. |
| 2005/0256802 A1 | 11/2005 | Ammermann et al. |
| 2006/0149665 A1 | 7/2006 | Weksler |
| 2006/0235758 A1 | 10/2006 | Schleicher |
| 2006/0282382 A1 | 12/2006 | Balasubramanian et al. |
| 2007/0143227 A1 * | 6/2007 | Kranzley ............... G06Q 20/02 705/67 |
| 2008/0028228 A1 | 1/2008 | Mardikar et al. |
| 2008/0033878 A1 | 2/2008 | Krikorian et al. |
| 2008/0168544 A1 | 7/2008 | Von Krogh |
| 2008/0172341 A1 | 7/2008 | Grandeii |
| 2009/0313147 A1 | 12/2009 | Balasubramanian et al. |
| 2010/0153200 A1 | 6/2010 | Thomas |
| 2010/0169215 A1 | 7/2010 | Balasubramanian et al. |
| 2010/0318468 A1 * | 12/2010 | Carr .................. G06Q 20/027 705/79 |
| 2011/0047054 A1 | 2/2011 | Ginter et al. |
| 2011/0103579 A1 * | 5/2011 | Martin .................. G06F 21/602 380/28 |
| 2011/0167002 A1 | 7/2011 | Balasubramanian et al. |
| 2011/0208658 A1 * | 8/2011 | Makhotin ............... G06F 21/34 705/75 |
| 2011/0258090 A1 | 10/2011 | Bosch et al. |
| 2012/0016728 A1 | 1/2012 | Ahmad et al. |
| 2012/0116933 A1 | 5/2012 | Matthews et al. |
| 2012/0197760 A1 | 8/2012 | Balasubramanian et al. |
| 2012/0297188 A1 * | 11/2012 | van der Linden .... H04L 63/045 713/165 |
| 2013/0211934 A1 | 8/2013 | Balasubramanian |
| 2013/0243195 A1 * | 9/2013 | Kruegel ................ H04W 12/04 380/270 |
| 2014/0081863 A1 | 3/2014 | Balasubramanian |
| 2014/0089194 A1 | 3/2014 | Balasubramanian |
| 2014/0108250 A1 | 4/2014 | Balasubramanian |
| 2014/0156532 A1 | 6/2014 | Balasubramanian |

(56) References Cited

U.S. PATENT DOCUMENTS

| | | | |
|---|---|---|---|
| 2015/0271150 A1* | 9/2015 | Barnett | G06F 21/73 |
| | | | 713/171 |
| 2016/0092872 A1 | 3/2016 | Pakash et al. | |
| 2018/0018662 A1* | 1/2018 | Enright | G06Q 20/4018 |
| 2018/0309735 A1* | 10/2018 | Barnett | H04L 63/0435 |
| 2018/0316491 A1* | 11/2018 | Pivovarov | G06F 21/73 |
| | | | 713/171 |
| 2020/0167775 A1* | 5/2020 | Reese | G06Q 20/4014 |

FOREIGN PATENT DOCUMENTS

| | | | |
|---|---|---|---|
| CN | 104838399 A | 8/2015 | |
| EP | 0 668 579 A2 | 8/1995 | |
| EP | 1 107198 B1 | 6/2001 | |
| EP | 1 134 707 A1 | 9/2001 | |
| GB | 2360380 | 9/2001 | |
| JP | 60 079466 | 5/1985 | |
| WO | WO 93/04425 | 3/1993 | |
| WO | WO 99/07121 | 2/1999 | |
| WO | WO 00/01108 A | 1/2000 | |
| WO | WO-0001108 A2 * | 1/2000 | H04L 63/0407 |
| WO | WO 01/18719 A1 | 3/2001 | |
| WO | WO 01/18720 A1 | 3/2001 | |
| WO | WO-0118720 A1 * | 3/2001 | G06Q 20/12 |
| WO | WO 01/26062 A1 | 4/2001 | |
| WO | WO 01/46918 A2 | 6/2001 | |
| WO | WO-0146918 A2 * | 6/2001 | G06F 21/34 |
| WO | WO 01/78493 A3 | 10/2001 | |
| WO | WO 01/80100 A1 | 10/2001 | |
| WO | WO-0178493 A2 * | 10/2001 | G06Q 20/3821 |
| WO | WO 01/82246 A2 | 11/2001 | |
| WO | WO 02/25604 | 3/2002 | |
| WO | WO 02/44976 A2 | 6/2002 | |
| WO | WO 03/107242 A1 | 12/2003 | |

OTHER PUBLICATIONS

Ahmed Sechrouchni, Ahmed Sechrouchni, Mostafa Hashem Sherif, Protocols for Secure Electronic Commerce, Mar. 2000 CRC Press, Inc. (Year: 2000).*

Bürk, et al., "Value Exchange Systems Enabling Security and Unobservability," Elsevier Science Publishers, vol. 9, No. 8, Dec. 1990, pp. 715-721.

David Chaum, "Security Without Identification: Transaction Systems to Make Big Brother Obsolete," Communications of the ACM, vol. 28, No. 10, Oct. 1985, pp. 1030-1044.

David Chaum, "Achieving Electronic Privacy," Scientific American, vol. 267, No. 2, Aug. 1992, pp. 76-81.

Exhibit AW2 to the statutory declaration of Andrew Weller Jan. 15, 2009—Joint press release issued by Visa and other technology providers (Jun. 27, 2001).

Exhibit BB4 to the statutory declaration of Bahram Boutorabi Jan. 27, 2009—*An Introduction to Authentication* (GPayment white paper—2000-2002).

Exhibit BB5 to the statutory declaration of Bahram Boutorabi Jan. 27, 2009—*Authentication* (GPayment white paper—2000-2002).

Exhibit BB6 to the statutory declaration of Bahram Boutorabi Jan. 27, 2009—*Smart Payment Technology* (GPayment white paper—2000-2002).

Exhibit BB7 to the statutory declaration of Bahram Boutorabi Jan. 27, 2009—*Electronic Wallets: Past, Present and Future* (GPayment white paper—2000-2002).

Exhibit BB8 to the statutory declaration of Bahram Boutorabi Jan. 27, 2009—*Pseudo Card Numbers* (GPayment white paper—2000-2002).

Exhibit BB9 to the statutory declaration of Bahram Boutorabi Jan. 27, 2009—Cached version of www.gpayments.com (May 11, 2002).

Exhibit BB10 to the statutory declaration of Bahram Boutorabi Jan. 27, 2009—Presentation entitled ActiveAccess Overview (Nov. 22, 2001).

Exhibit BB11 to the statutory declaration of Bahram Boutorabi Jan. 27, 2009—GPayments paper outlining authentication products (May 29, 2002).

Exhibit BB13 to the statutory declaration of Bahram Boutorabi Apr. 7, 2009—*3-D Secure Vendor Forum* (Visa presentation—Nov. 2, 2000).

Exhibit BB14 to the statutory declaration of Bahram Boutorabi Apr. 7, 2009—*3-D Secure Payment Authorisation* (Visa presentation—Jan. 25, 2001).

Exhibit BB15 to the statutory declaration of Bahram Boutorabi Apr. 7, 2009—*3-D Secure Vendor Forum* (Visa presentation—Jan. 25, 2001).

Exhibit BB16 to the statutory declaration of Bahram Boutorabi Apr. 7, 2009—*3-D Secure Interoperability Center* (Visa presentation—Jan. 25, 2001).

Exhibit BB17 to the statutory declaration of Bahram Boutorabi Apr. 7, 2009—Wikipedia Plug-in article (as at Apr. 7, 2009).

Exhibit BB18 to the statutory declaration of Bahram Boutorabi Apr. 7, 2009—*ActivePayment* (GPayment presentation—Feb. 7, 2000).

Exhibit BB19 to the statutory declaration of Bahram Boutorabi Apr. 7, 2009—*Eliminating Payment Fraud* (GPayment presentation—Apr. 16, 2002).

Exhibit BB20 to the statutory declaration of Bahram Boutorabi Apr. 7, 2009—*Authentication and Payment in Asia Pacific* (GPayment presentation—May 2, 2002).

Exhibit BB21 to the statutory declaration of Bahram Boutorabi Apr. 7, 2009—*VeriSign Conference Call and Online Demonstration* (GPayments presentation—May 21, 2002).

Exhibit BB22 to the statutory declaration of Bahram Boutorabi Apr. 7, 2009—Cached version of www.cyota.com (Feb. 13, 2002).

Exhibit BB23 to the statutory declaration of Bahram Boutorabi Apr. 7, 2009—PC-EFTPOS website (as at Apr. 7, 2009).

Exhibit BB24 to the statutory declaration of Bahram Boutorabi Apr. 7, 2009—OCV Implementation Suggestions (Oct. 22, 1999).

Exhibit BB25 to the statutory declaration of Bahram Boutorabi Mar. 5, 2010—GPayments ActiveAccess Overview (Apr. 16, 2002).

Exhibit BB26 to the statutory declaration of Bahram Boutorabi Mar. 5, 2010—Screen captures from Visa-certified version of GPayments (May 23, 2002).

Exhibit BB27 to the statutory declaration of Bahram Boutorabi Mar. 5, 2010—Schedule of certification of ActiveMerchant and ActiveAccess (Jun. 12, 2002).

Exhibit BB28 to the statutory declaration of Bahram Boutorabi Mar. 5, 2010—Presentation given at Sun Microsystems (May 2002).

Hamann et al. "Securing E-Business Applications Using Smart Cards," IBM Systems Journal, 2001. vol. 40, No. 3, pp. 635-647. [Accessed May 29, 2013—ProQuest] http://search.proquest.com/docview/222422057.

Karpinski. "IBM Payment Software to Run Atop App Server," InternetWeek, Nov. 1999. No. 790, p. 9. [Accessed May 29, 2013—ProQuest] http://search.proquest.com/docview/226906024.

Kutler et al. "MasterCard, IBM Team Up for E-Wallet Distribution," American Banker, Sep. 15, 1999. vol. 164, No. 177. [Accessed May 29, 2013—ProQuest] http://search.proquest.com/docview/249853957.

Malhotra. "Wireless Group Makes Strides, Still Faces Obstacles," American Banker, Jun. 7, 2002. vol. 167, No. 109. [Accessed May 29, 2013—ProQuest] http://search.proquest.com/docview/249855144.

Stallings. "The SET Standard & E-Commerce," Dr. Dobb's Journal, Nov. 2000. vol. 25, No. 11, pp. 30-36. [Accessed May 29, 2013—ProQuest] http://search.proquest.com/docview/202722072.

"Payments Could Be a Gold Mine Standards Remain Overriding Issue, BITS Attempts to Unite Industry," Retail Delivery System News, Feb. 13, 1998. vol. 3, No. 3, p. 1. [Accessed May 29, 2013—ProQuest] http://search.proquest.com/docview/206583755.

Petition to Institute a Covered Business Method Patent Review under Section 18 of the Leahy-Smith America Invents Act and 37 C.F.R. Section 42.300 et seq. regarding U.S. Pat. No. 7,051,002 for Universal Merchant Platform for Payment Authentication, filed with the United States Patent and Trademark Office on Nov. 15, 2013.

Petition to Institute a Covered Business Method Patent Review under Section 18 of the Leahy-Smith America Invents Act and 37

(56) References Cited

OTHER PUBLICATIONS

C.F.R. Section 42.300 et seq. regarding U.S. Pat. No. 7,693,783 for Universal Merchant Platform for Payment Authentication, filed with the United States Patent and Trademark Office on Nov. 16, 2013.
Petition to Institute a Covered Business Method Patent Review under Section 18 of the Leahy-Smith America Invents Act and 37 C.F.R. Section 42.300 et seq. regarding U.S. Pat. No. 8,140,429 for Universal Merchant Platform for Payment Authentication, filed with the United States Patent and Trademark Office on Nov. 15, 2013.
Declaration of Jason Napsky in Support of Petitions for Covered Business Method Patent Review regarding U.S. Pat. No. 7,051,002, U.S. Pat. No. 7,693,783 and U.S. Pat. No. 8,140,429 for Universal Merchant Platform for Payment Authentication, executed on Nov. 13, 2013.
Declaration of Greg Wooten in Support of Petitions for Covered Business Method Patent Review regarding U.S. Pat. No. 7,051,002, U.S. Pat. No. 7,693,783 and U.S. Pat. No. 8,140,429 for Universal Merchant Platform for Payment Authentication, executed on Nov. 14, 2013.
Declaration of Sandeep Chatterjee, Ph.D. in Support of Petitions for Covered Business Method Patent Review regarding U.S. Pat. No. 7,051,002, U.S. Pat. No. 7,693,783 and U.S. Pat. No. 8,140,429 for Universal Merchant Platform for Payment Authentication.
Exhibit 1010 in Support of Petitions for Covered Business Method Patent Review regarding U.S. Pat. No. 7,051,002, U.S. Pat. No. 7,693,783 and U.S. Pat. No. 8,140,429 for Universal Merchant Platform for Payment Authentication, SOAP Version 1.2, W3C Working Draft Jul. 9, 2001, http://www.w3.org/TR/2001/WD-soap12-20010709/.
IBM & Microsoft Corp., "Web Services Framework", Apr. 11, 2001.
"N Software's MPI Software", 2002 (no document available).
Abad-Peiro et al., "Designing a Generic Payment System", Nov. 26, 1996.
Bartolini et al., "Requirements for Automated Negotiation", Apr. 11, 2001.
Best, "WSWS Position Paper", Apr. 11, 2001.
Bettag, "Position Paper for W3C Workshop on Web Services", Apr. 11, 2001.
Bosworth, "Developing Web Services", Apr. 11, 2001.
Brown, "VeriSign Web Services Positioning Paper"., Apr. 11, 2001.
Brown, "Reliable Messaging", Apr. 11, 2001.
Camarena, "WebMethods Position on Web Services", Apr. 11, 2001.
Cutler, "Chevron Interest in Web Services Workshop", Apr. 11, 2001.
Daniels, "Web Services Position Paper", Apr. 11, 2001.
Derose, "Position Paper for the W3C WSDL Workshop", Apr. 11, 2001.
Dornfest, "Position Paper for W3C Workshop on Web Services", Apr. 11, 2001.
Douglas, "Infrastructure Requirements for Business-Class Web Services", Apr. 11, 2001.
Edgar, "W3C Web Services: A Position Paper for the W3C", Apr. 11, 2001.
Eisenberg, "W3C Web Services Workshop Position Paper: Preparing for the Web Services Paradigm", Apr. 11, 2001.
Evans, "Transaction Internet Protocol: Facilitating Distributed Internet Applications", Apr. 11, 2001.
Ferguson, "Web Services Architecture: Direction and Position Paper", Apr. 11, 2001.
Frolund, et al., "Transactional Conversations", Apr. 11, 2001.
Fuchs, "Commerce One Position Paper—Workshop on Web Services", Apr. 11, 2001.
Gartner, "W3C Web Services Workshop—Position Paper", Apr. 11, 2001.
Govindarajan et al., "Conversation Definitions: Defining Interfaces of Web Services" Apr. 11, 2001.
Govindarajan, et al., "Web Services Architecture Overview Paper", Apr. 11, 2001.
Guardalben, "W3C Web Services Workshop Position Paper", Apr. 11, 2001.
Gudgin, et al., "SOAP Version 1.2 Specification", Jul. 9, 2001.
Hale, "Content Management for Web Services", Apr. 11, 2001.
Hall, et al., "Web Services Workshop Intel Position", Apr. 11, 2001.
Ingham et al., "Position Paper on Web Transactions", Apr. 11, 2001.
Isaacson, "Web Services Workshop Position Paper", Apr. 11, 2001.
Iwasa, "Fujitsu Position Paper for Workshop on Web services", Apr. 11, 2001.
Jerbic, "Hewlett Packard Position Paper to the Worldwide Web Consortium Workshop on Web Services", Apr. 11, 2001.
Karakashian, "BEA Position Paper on the W3C Web Services Workshop", Apr. 11, 2001.
Karp, et al., "Advertising and Discovering Business Services", Apr. 11, 2001.
Ketchpel, et al., "U-PAI: A Universal Payment Application Interface", 1996.
Laskey, "Position Paper Regarding Web Services", Apr. 11, 2001.
Machiraju, "A Peer-to-Peer Service Interface for Manageability", Apr. 11, 2001.
Manes, "Enabling Open, Interoperable, and Smart Web Services: The Need for Shared Context", Apr. 11, 2001.
Mitra, "Ericsson contribution to the W3C Workshop on Web Services", Apr. 11, 2001.
Moberg, "Web Services, Synchronous Collaborations, and Solutions to Distributed Process Coordination Problems Reflecting Legacy Integration Latencies", Apr. 11, 2001.
Morciniec, et al., "Towards the Electronic Contract", Apr. 11, 2001.
Moreau et al., "Using XML for Describing Web Services", Apr. 11, 2001.
Mullins, "Web Services Workshop Position Paper", Apr. 11, 2001.
Newcomer, et al., "Web Services Definition Position Paper", Apr. 11, 2001.
Nielsen, "SOAP Addressing and Path Modeling", Apr. 11, 2001.
Nottingham, "Web Service Scalability and Performance with Optimising Intermediaries", Apr. 11, 2001.
Ogbuji, "Position Paper for W3C Workshop on Web Services", Apr. 11, 2001.
Orchard, "Jamcracker W3C Web Services Workshop Position Paper", Apr. 11, 2001.
Prud'Hommeaux, Eric, "Semantic Web Position Paper", Apr. 11, 2001.
Reagle, Jr., XML Security:, Apr. 11, 2001.
Reed, "Requirements for a Global Identity Management Service", Apr. 11, 2001.
Sabbouh, et al., "Interoperability: Workshop on Web Services", Apr. 11, 2001.
Sankar, WebServices Framework & Assertion Exchange using SAML Apr. 11, 2001.
Scott, "The Road to Web Services", Apr. 11, 2001.
Seaborne et al., "A Framework for Business Composition", Apr. 11, 2001.
Sedukhin, "Platform for Assembly, Orchestration, and Management of Web Services", Apr. 11, 2001.
Service Real Authentication Data Storage, Aug. 14, 2002.
Sormunen, "Position Paper to W3C Forum WorkShop Web Services", Apr. 11, 2001.
Srivastava, "Oracle Dynamic Services: Oracle's Web Services Framework", Apr. 11, 2001.
Tauber, "Protocol for Accessing RDF-Based Registries", Apr. 11, 2001.
Tenenbaum et al., "Eco System: An Internet Commerce Architecture", May 1997.
Thatte, "Message Exchange Protocols for Web Services", Apr. 11, 2001.
Thompson, "Web Services—Beyond HTTP Tunneling", Apr. 11, 2001.
Verified by Visa (VbV) Protocol, (NS 000580-680), 2001.
Virdhagriswaran, et al., "Two Level Architecture for Web Service Interactions", Apr. 11, 2001.
Whitmer, "Web Services for Clients", Apr. 11, 2001.
Wiechers, "SAP Position Paper", Apr. 11, 2001.
Winer, "UserLand's Position on Web Services", Apr. 11, 2001.

(56) References Cited

OTHER PUBLICATIONS

Zilles et al., "Position paper", Apr. 11, 2001.
Gpayments: Visa 3-D Secure vs. MasterCard SPA, Mar. 1, 2002, pp. 1-37.

* cited by examiner

AUTHENTICATION TO AUTHORIZATION BRIDGE USING ENRICHED MESSAGES

This application claims the benefit of U.S. Provisional Patent Application No. 62/362,876, filed Jul. 15, 2016, which is incorporated herein by reference in its entirety.

BACKGROUND

The subject matter of the present specification generally relates to the art of secure data communication, and more specifically, to securely sending sensitive information along existing rails to a targeted audience. Exemplary embodiments disclosed herein find particular application in conjunction with the secure communication of selected information or data from an identity authentication system to a transaction authorization system in connection with the processing of a credit card or other payment instrument transaction, and they will be described herein with particular reference thereto. However, it is to be appreciated that various exemplary embodiments such as those disclosed herein are also amenable to other like applications.

Generally, in connection with credit card and/or other like payment instruments transactions conducted over telecommunication networks (e.g., including without limitation wired and/or wireless networks, the Internet, WiFi, cellular networks, disparate systems, private networks, etc.), the current state of consumer authentication relies on merchants and corresponding systems in a network ecosystem to receive, maintain and forward authentication information. The authentication of cardholders in connection with commercial transactions conducted over a telecommunications network (e.g., such as the Internet) has been popularized by initiatives and/or programs such as Visa's Verified by Visa (VbV) and MasterCard's SecureCode. Such programs allow the issuer of a credit card to authenticate the identity of a cardholder prior to authorizing completion of a transaction. However, the authentication is often isolated from authorization as they are often two separate systems that only communicate via predefined messages, e.g., prescribed by the particular card network, be it Visa, MasterCard or otherwise. Accordingly, this isolation or separation tends to limit the information that can be shared between the authentication and authorization steps. This can become more important when risk based authentication is used by the issuer in the decision to authenticate, and the only information passed to the authorization system is the authentication outcome (e.g., a binary result such as positive or negative).

Accordingly, it can be desirable to bridge the authentication and authorization systems allowing additional information to be transferred and/or communicated therebetween, e.g., so that false positive and/or false negatives produced by the authorization system may be potentially reduced. However, heretofore, a suitable system, approach and/or method has not been developed and/or implemented.

Disclosed herein is a new and/or improved system and/or method for securely communicating selected information and data in enriched messages passed between an authentication system and/or step and an authorization system and/or step using existing and/or predefined protocols and/or connections (generally referred to and/or otherwise known as "rails") established by the card networks, e.g., such as Visa, Mastercard, etc. In essence, by using the enriched message as disclosed herein, a bridge is established between authentication and authorization which is generally referred to nominally herein as an "Authentication/Authorization Bridge." Using the enriched message and Authentication/Authorization Bridge, a merchant or Access Control Server (ACS) system or other suitable entity is able to pass certain values and/or data through the ecosystem using the existing rails that may be useful throughout the authentication and authorization steps. Suitably, the data in the enriched message is secured and compatible with a network cryptogram check, thus providing the merchant with the appropriate protection offered by consumer authentication. One example that illustrates the usage of the enriched message is the merchant making a minimally invasive change to the message enabling the issuer to better consume and use the authentication results for authorization decision making. More broadly speaking, the approach described herein facilitates the transmitting of information from someone and/or something that is submitting a transaction for settlement or the like to someone and/or something that will provide the requested settlement or the like.

BRIEF DESCRIPTION

This Brief Description is provided to introduce concepts related to the present specification. It is not intended to identify essential features of the claimed subject matter nor is it intended for use in determining or limiting the scope of the claimed subject matter. The exemplary embodiments described below are not intended to be exhaustive or to limit the claims to the precise forms disclosed in the following Detailed Description. Rather, the embodiments are chosen and described so that others skilled in the art may appreciate and understand the principles and practices of the subject matter presented herein.

In accordance with one aspect, a system for electronic communication includes: one or more processors of a third party configured to: create a Pre-Authentication Transaction Number (Pre-ATN) by combining a number with a Special Encode Value (SEV), wherein the SEV is a single digit integer value; encrypt the Pre-ATN using a Format Preserving Encryption (FPE) to generate an encrypted Authentication Transaction Number (ATN); and send the encrypted ATN to an access control server (ACS) to use the encrypted ATN to generate a cardholder Authentication Verification Value (CAVV) or an Accountholder Authentication Value (AAV).

In the system of the preceding paragraph, the ACS may be provisioned with FPE keys, key indexes and SEV definition tables; and the ACS may be configured to use a key index of the key indexes for both FPE and a card verification value (CVV) calculation. The ACS may be configured to use a FPE base key corresponding to a selected key index along with a Primary Account Number (PAN) to create a unique key per PAN. The SEV definition tables may relate particular SEV values to information that is being bridged between: (i) an authentication procedure that authenticates the identity of a user; and (ii) an authorization procedure that authorizes a transaction of the user. The system may further include a decoding entity configured to: perform Format Preserving Decryption (FPD) using the ATN and a Primary Account Number (PAN) unique key to generate the Pre-ATN including the SEV; and use the SEV to look up a corresponding definition in a table. The ACS may be configured to authenticate a consumer by exchanging, with the consumer, authentication credentials including a password; and the system may further comprise one or more processors of a decoding entity configured to obtain the SEV by: receiving an authorization request including the CAVV or the AAV; deconstructing the ATN and a key indicator from the CAVV or AAV; and decrypting the ATN using a Format Preserving Decryption (FPD) routine; and the one or more processors of the decoding entity may be further configured to use the SEV to look up a corresponding definition in a table. The one or more processors of the decoding entity may be further configured to use SEV definition tables to relate particular SEV values to bridge information between the authentication procedure and the authorization procedure. The number may be a random three digit number.

In accordance with another aspect, a method for electronic communication includes: with one or more processors of a third party: creating a Pre-Authentication Transaction Number (Pre-ATN) by combining a number with a Special Encode Value (SEV), wherein the SEV is a single digit integer value; encrypting the Pre-ATN using a Format Preserving Encryption (FPE) to generate an encrypted Authentication Transaction Number (ATN); and sending the encrypted ATN to an access control server (ACS); and with the ACS: using the encrypted ATN to generate a cardholder Authentication Verification Value (CAVV) or an Accountholder Authentication Value (AAV).

In a method as described in the preceding paragraph, the ACS may be provisioned with FPE keys, key indexes and SEV definition tables; and a key index of the key indexes is used for both FPE and a card verification value (CVV) calculation. A FPE base key corresponding to a selected key index may be used along with a Primary Account Number (PAN) to create a unique key per PAN. The SEV definition tables may relate particular SEV values to information that is being bridged between: (i) an authentication procedure that authenticates the identity of a user; and (ii) an authorization procedure that authorizes a transaction of the user. The method may further include: performing Format Preserving Decryption (FPD) using the ATN and a Primary Account Number (PAN) unique key to generate the Pre-ATN including the SEV; and using the SEV to look up a corresponding definition in a table. The method may further include: authenticating a consumer by exchanging, between the ACS and the consumer, authentication credentials including a password; and with one or more processors of a decoding entity, obtaining the SEV by: receiving an authorization request including the CAVV or the AAV; deconstructing the ATN and a key indicator from the CAVV or AAV; and decrypting the ATN using a Format Preserving Decryption (FPD) routine; and further with the one or more processors of the decoding entity, using the SEV to look up a corresponding definition in a table. The method may further include: as part of an authentication procedure, authenticating a consumer by exchanging, between the ACS and the consumer, authentication credentials including a password; and as part of an authorization procedure, with one or more processors of a decoding entity, obtaining the SEV by: receiving an authorization request including the CAVV or the AAV; deconstructing the ATN and a key indicator from the CAVV or AAV; and decrypting the ATN using a Format Preserving Decryption (FPD) routine; and further with the one or more processors of the decoding entity, using the SEV to look up a corresponding definition in a table to bridge information between the authentication procedure and the authorization procedure.

In accordance with another aspect, a decoding entity may include one or more processors configured to: obtain a Special Encode Value (SEV), the SEV being a single digit integer value, by: receiving an authorization request including cardholder Authentication Verification Value (CAVV) or an Accountholder Authentication Value (AAV); deconstructing a Authentication Transaction Number (ATN) and a key indicator from the CAVV or AAV; and decrypting the ATN using a Format Preserving Decryption (FPD) routine; and use the SEV to look up a corresponding definition in a table to bridge information between an authentication procedure and an authorization procedure.

Numerous advantages and benefits of the subject matter disclosed herein will become apparent to those of ordinary skill in the art upon reading and understanding the present specification. It is to be understood, however, that the detailed description of the various embodiments and specific examples, while indicating preferred and/or other embodiments, are given by way of illustration and not limitation.

BRIEF DESCRIPTION OF THE DRAWINGS

The following Detailed Description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION

For clarity and simplicity, the present specification shall refer to structural and/or functional elements, relevant standards, algorithms and/or protocols, and other components, methods and/or processes that are commonly known in the art without further detailed explanation as to their configuration or operation except to the extent they have been modified or altered in accordance with and/or to accommodate the preferred and/or other embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

Figure 1:
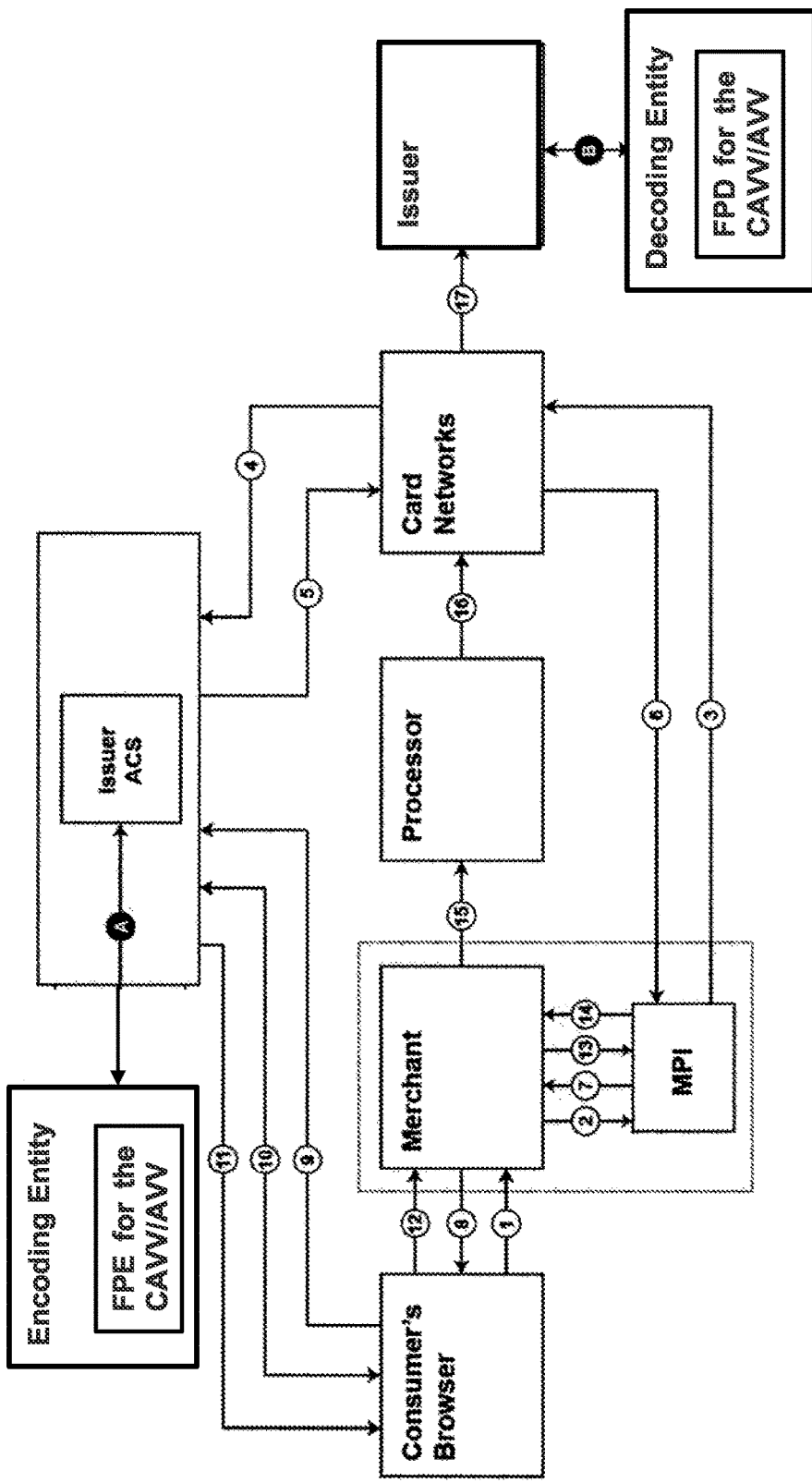
FIG. 1 is a diagrammatic illustration showing one exemplary embodiment employing an Authentication/Authorization Bridge and enhanced messaging system and/or method in accordance with aspects of the present inventive subject matter.

With reference to FIG. 1, where the particular steps described below are illustrated as circled reference numerals, there is shown a diagrammatic illustration of one exemplary method for processing an authenticated transaction between a consumer and merchant conducted over a telecommunications network, e.g., such as the Internet. As shown, a consumer (e.g., employing a suitable browser or application running on an end user computing and/or communication device or using some form of an Internet connected device) accesses a website of a merchant which is provided via a hardware server (e.g., a web server) operatively connected to a telecommunications network, e.g., such as the Internet. Suitably, the computing device of the consumer may be a computer, smartphone or other like device capable of supporting a browser running thereon and of operatively connecting to the telecommunications network in order to communicate with and/or exchange messages, signals, information and/or data with other elements, systems, servers and/or like components also operatively connected with the telecommunications network.

In practice, the consumer may select a number of goods, services and/or the like, e.g., by selecting and/or placing the same in a virtual shopping cart or the like. After navigating to a checkout or other like page on the merchant's website, the consumer may select to initiate a purchase of the chosen items, e.g., employing their browser to click on a designated link or option provided on the checkout page. Accordingly, the consumer is prompted to select a payment option and/or enter payment information which is in turn forwarded to the merchant. For example, the consumer may select to pay via credit card, in which case the payment information forwarded to the merchant may include the credit card number (e.g., a Primary Account Number (PAN) or dynamic PAN), expiration date, name on the credit card, etc. The forwarding of payment information from the consumer to the merchant's server is illustrated as step 1 in FIG. 1.

In response, the merchant's server sends a request to a merchant plug-in (MPI) to create a Verify Enrollment Request (VEReq) or other like message. See step 2 in FIG. 1. For the sake of simplicity herein, only a single MPI is shown in FIG. 1. However, in practice, multiple MPIs are typically employed—a separate MPI being employed for each different card network. The VEReq or other like message is used to verify enrollment of the credit card in a particular authentication initiative or program (e.g., VbV, SecureCode, etc.) prescribed by the particular associated payment scheme or card network (e.g., Visa, Mastercard, etc.). In general, the VEReq will include the PAN received with the payment information. Essentially, the VEReq message is a request, ultimately sent to the issuer's Access Control Server (ACS), to check if the PAN (contained in the VEReq) is enrolled in the particular authentication initiative or program.

In turn (see step 3 of FIG. 1), the VEReq or other like message is sent to a directory server (DS) for the associated payment scheme or card network. Suitably, the DS is part of the card network. In practice, the DS will perform a Bank Identification Number (BIN) lookup and if the BIN is for an ACS operated by the issuer, then the VEReq is forwarded to the issuer's ACS (see step 4 of FIG. 1). In general, the ACS is an entity that controls authentication of cardholders. The ACS accepts a VEReq and in response returns a Verify Enrollment Response (VERes); and accepts a Payment Authentication Request (PAReq) and in response returns a Payment Authentication Response (PARes). The ACS is also responsible for generating a Cardholder Authentication Verification Value (CAVV) and/or an Accountholder Authentication Value (AAV). The CAVV and AAV are payment scheme specific values that are generated on successful authentications or attempts transactions. In general, each includes: (i) an Authentication Transaction Number (ATN); and (ii) a Card Verification Value (CVV). Generally, the three digit CVV is computed using the four digit ATN, PAN, status codes, and two Data Encryption Standard DES keys—the specifics of which may be unique between different implementations (e.g., currently the specifics differ as between Visa and MasterCard implementations). The value of the CVV may be validated by having the two DES keys shared between two parties along with the PAN, ATN and status codes.

In response to the VEReq or other like message, the issuer's ACS replies with a Verify Enrollment Response (VERes) or other like message (see step 5 of FIG. 1). In turn, the VERes is forwarded to the MPI (see step 6 of FIG. 1). Essentially, the VERes indicates whether or not the PAN in question is enrolled in the particular authentication initiative or program. In general, the VERes is ultimately returned to the merchant, and if the PAN is indeed enrolled, the VERes will include the Uniform Resource Locator (URL) or address of the ACS (referred to as the ACSURL). That is to say, the ACSURL indicates the address to which the cardholder's browser should ultimately sent (e.g., via a Hypertext Transfer Protocol (HTTP) POST) a PAReq, Merchant Data (MD) and TermURL (as described below).

Upon receiving the VERes, the MPI uses the VERes to generate a PAReq or other like message which is forwarded to the merchant's server, e.g., as shown in step 7 of FIG. 1.

Accordingly, upon receiving the PAReq, the merchant's server creates a form fields including the PAReq, MD and TermURL and forwards the same to the consumer's browser directing the consumer's browser to submit the data to the ACSURL (e.g., via an HTTP POST). See step 8 of FIG. 1. In general, the MD is data sent along with the PAReq that will be returned with the corresponding PARes to help the merchant reestablish the session. The TermURL identifies the address to POST or otherwise submit the PARes and MD field from the issuer's ACS to the merchant via the consumer's browser. As shown in step 9, the PAReq, MD and TermURL are in turn POSTed or otherwise submitted the issuer's ACS.

As shown in step 10, one or more requests, responses, messages, data and/or information may be exchanged between the consumer and the ACS in order to authenticate the consumer. For example, this may include the submission of various authentication credentials, including but not limited to: a password, a Personal Identification Number (PIN), biometric data (such as finger print, retinal scan, voice recognition or facial recognition data), risk criteria and calculation, etc.

Based on the outcome of the authentication, the CAVV or AAV is generated accordingly. Suitably, the ACS will generate the CAVV or AAV. More specifically, as shown in step A, a Special Encode Value (SEV) (e.g., a single digit integer value between 0 and 9) is first encoded into the ATN. The so encoded ATN is then encrypted using a Format Preserving Encryption (FPE). As shown, the encoding and encryption is carried out by a third party processor and/or hardware server. The so encrypted ATN is then passed back to the ACS and used to generate the CAVV or AAV (as the case may be) with the otherwise standard CAVV/AAV generating algorithm. Then, the PARes message is signed by the ACS. Notably, because the solution proposed herein leverages FPE, it is compatible with the industry standard cryptographic checks used by the card networks.

As shown in step 11, the issuer's ACS returns a page to the consumer's browser that will POST or otherwise submit the PARes (which includes the CAVV/AAV generated using the encoded/encrypted ATN) and MD field to the TermURL. The POSTed PARes and MD are in turn received by the merchant (see step 12 of FIG. 1); and in step 13, the merchant passes the PARes to the MPI.

Suitably, the MPI verifies the signature of the PARes and returns (see step 14) the CAVV/AAV and the Electronic Commerce Indicator (ECI) to the merchant. The ECI a value which indicates the result or outcome of the authentication performed in step 10.

Having received the CAVV/AAV and ECI, to obtain authorization for the transaction, the merchant forwards the same to a transaction processor (possibly through a payment gateway—not shown). See step 15 of FIG. 1.

The transaction processor formats a message for the specific card network (e.g., be it Visa, Mastercard, etc.) and passes the ECI and CAVV/AAV to the card network (see step 16). Suitably, the card network can validate the validity of the CAVV/AAV using the cryptographic method specified for the CAVV/AVV and/or the card network can also perform replay CAVV/AAV analysis without a problem because it is backward compatible. The foregoing feature is significantly noteworthy. Replay analysis asserts that a sample history of successful CAVV/AVV are not being reused.

Illustrated as step 17, an authorization request, including the PAN and CAVV/AAV, is sent to the issuer.

Having received the authorization request, the issuer may submit the PAN and CAVV/AAV to a Format Preserving Decryption (FPD) routine. Suitably, the routine may be executed by the issuer or a suitable third party. In any event, the ATN and a key indicator are stripped and/or deconstructed from the CAVV/AAV. The ATN is then decrypted using FPD. Accordingly, the SEV is obtained and returned to the issuer.

Figure 2:
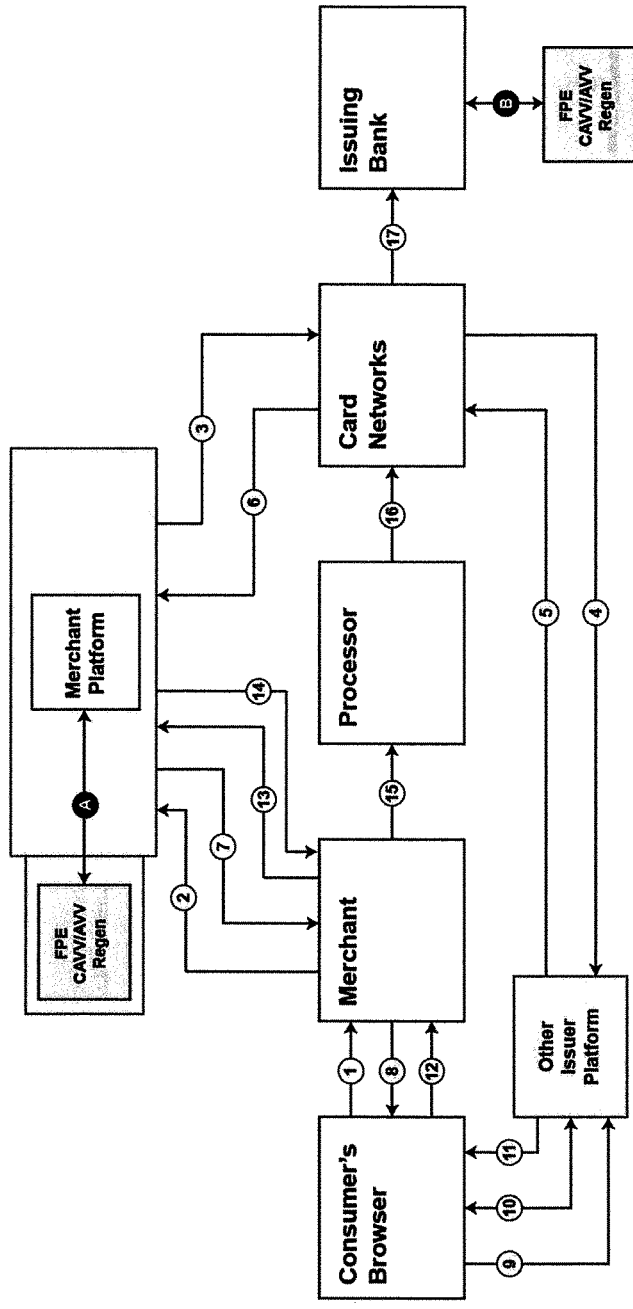
FIG. 2 is a diagrammatic illustration showing another exemplary embodiment employing an Authentication/Authorization Bridge and enhanced messaging system and/or method in accordance with aspects of the present inventive subject matter.

FIG. 2 shows another embodiment in which a Universal Merchant Platform (UMP) is employed. For example, the UMP may be implemented as disclosed in U.S. Pat. Nos. 7,051,002; 7,693,783; 8,140,429; 8,645,266; and 8,650,118 and in U.S. Patent Application Publication Nos. US 2014/0081863 A1; US 2014/0108250 A1; US 2014/0089194 A1; and US 2014/0156532 A1; all of which patents and patent application publications are incorporated herein by reference in their entirety.

With reference to FIG. 2, where the particular steps described below are again illustrated as circled reference numerals, there is shown a diagrammatic illustration of another exemplary method for processing an authenticated transaction between a consumer and merchant conducted over a telecommunications network, e.g., such as the Internet. As shown, a consumer (e.g., employing a suitable browser or application running on an end user computing and/or communication device) accesses a website of a merchant which is provided via a hardware server (e.g., a web server) operatively connected to a telecommunications network, e.g., such as the Internet. Suitably, the computing device of the consumer may be a computer, smartphone or other like device capable of supporting a browser running thereon and of operatively connecting to the telecommunications network in order to communicate with and/or exchange messages, signals, information and/or data with other elements, systems, servers and/or like components also operatively connected with the telecommunications network.

In practice, the consumer may select a number of goods, services and/or the like, e.g., by selecting and/or placing the same in a virtual shopping cart or the like. After navigating to a checkout or other like page on the merchant's website, the consumer may select to initiate a purchase of the chosen items, e.g., employing their browser to click on a designated link or option provided on the checkout page. Accordingly, the consumer is prompted to select a payment option and/or enter payment information which is in turn forwarded to the merchant. For example, the consumer may select to pay via credit card, in which case the payment information forwarded to the merchant may include the credit card number (e.g., a Primary Account Number (PAN)), expiration date, name on the credit card, etc. The forwarding of payment information from the consumer to the merchant's server is illustrated as step 1 in FIG. 2.

In response, the merchant's server sends a request to a UMP (e.g., supporting a suitable MPI) to create a Verify Enrollment Request (VEReq) or other like message. See step 2 in FIG. 2.

In turn (see step 3 of FIG. 2), the VEReq or other like message is sent to a directory server (DS) for the associated payment scheme or card network. Suitably, the DS is part of the card network. In practice, the DS will perform a Bank Identification Number (BIN) lookup and if the BIN is for an ACS operated by the issuer, then the VEReq is forwarded to the issuer's ACS (see step 4 of FIG. 2).

In response to the VEReq or other like message, the issuer's ACS replies with a Verify Enrollment Response (VERes) or other like message (see step 5 of FIG. 2). In turn, the VERes is forwarded to the UMP (see step 6 of FIG. 2).

Upon receiving the VERes, the UMP uses the VERes to generate a PAReq or other like message which is forwarded to the merchant's server, e.g., as shown in step 7 of FIG. 2.

Accordingly, upon receiving the PAReq, the merchant's server creates a form fields including the PAReq, MD and TermURL and forwards the same to the consumer's browser directing the consumer's browser to submit the data to the ACSURL (e.g., via an HTTP POST). See step 8 of FIG. 2. As shown in step 9, the PAReq, MD and TermURL are in turn POSTed or otherwise submitted the issuer's ACS.

As shown in step 10, one or more requests, responses, messages, data and/or information may be exchanged between the consumer and the ACS in order to authenticate the consumer. For example, this may include the submission of various authentication credentials, including but not limited to: a password, a Personal Identification Number (PIN), biometric data (such as finger print, retinal scan, voice recognition or facial recognition data), risk criteria and calculation, etc.

Based on the outcome of the authentication, the CAVV or AAV is generated accordingly. Suitably, the ACS will generate the CAVV or AAV in the usual manner. As shown in step 11, the issuer's ACS returns a page to the consumer's browser that will POST or otherwise submit the PARes and MD field to the TermURL. The POSTed PARes and MD are in turn received by the merchant (see step 12 of FIG. 2); and in step 13, the merchant passes the PARes to the UMP. In practice, the UMP may employ the appropriate supported MPI for further processing. More specifically, as shown in step A, a Special Encode Value (SEV) (e.g., a single digit integer value between 0 and 9) is first encoded into the ATN. The so encoded ATN is then encrypted using a Format Preserving Encryption (FPE). The so encrypted ATN is then passed back into the otherwise standard CAVV or AAV generating algorithm (as the case may be) to be regenerated based on the pre-shared keys.

Suitably, the appropriate MPI supported on the UMP verifies the signature of the PARes and returns (see step 14) the CAVV/AAV (which includes the new CAVV/AAV regenerated using the encoded/encrypted ATN) and the Electronic Commerce Indicator (ECI) to the merchant.

Having received the CAVV/AAV and ECI, to obtain authorization for the transaction, the merchant forwards the same to a transaction processor (possibly through a payment gateway—not shown). See step 15 of FIG. 2.

The transaction processor formats a message for the specific card network (e.g., be it Visa, Mastercard, etc.) and passes the ECI and CAVV/AAV to the card network (see step 16). Suitably, the card network can validate the validity of the CAVV/AAV using the cryptographic method specified for the CAVV/AVV and/or the card network can also perform replay CAVV/AAV analysis without a problem.

Illustrated as step 17, an authorization request, including the PAN and CAVV/AAV, is sent to the issuer.

Having received the authorization request, the issuer may submit the PAN and CAVV/AAV to a Format Preserving Decryption (FPD) routine. Suitably, the routine may be executed by the issuer or a suitable third party. In any event, the ATN and a key indicator are stripped from the CAVV/AAV. The ATN is then decrypted using FPD. Accordingly, the SEV is obtained and returned to the issuer.

Figure 3:
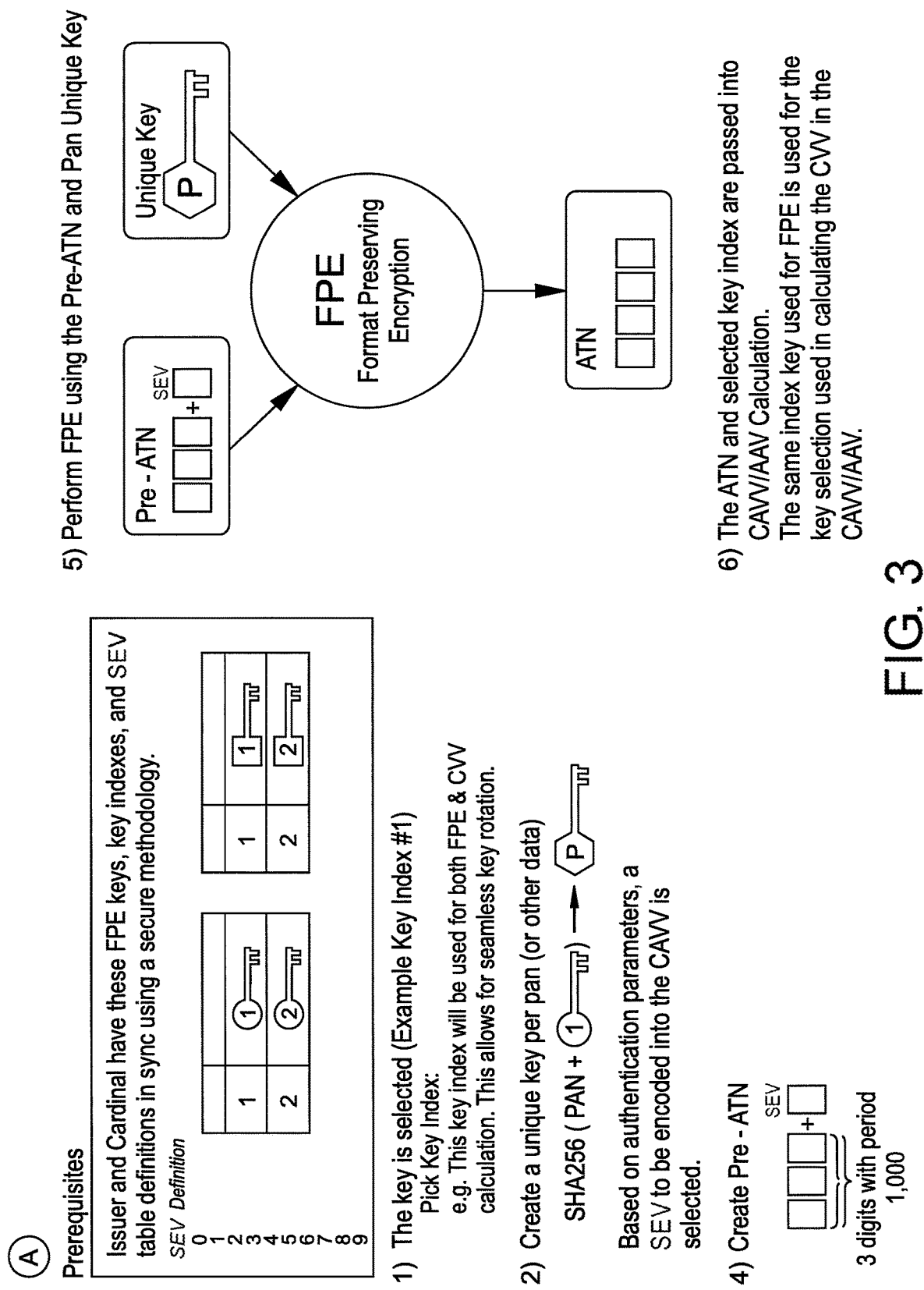
FIG. 3 is a diagrammatic illustration showing an exemplary encoding and encryption method according to an exemplary embodiment of the present inventive subject matter.

With reference now to FIG. 3, there is illustrated an exemplary embodiment by which step A is carried out. As shown, the issuer and encoding entity (e.g., the UPM) are provisioned with appropriate FPE keys, key indexes and SEV definition tables that are suitably maintained in synchronization using a sure methodology. The SEV definition tables relate particular SEV values to specific definitions, e.g., information that is being bridged between the authentication and authorization steps. Initially, a key index is selected, e.g., key index #1. This key index is used for both FPE and CVV calculation. This allows for seamless key rotation.

The FPE base key corresponding to the selected key index is used along with the PAN (or other suitable data) to create a unique key per PAN. For example, as shown, a 256-bit Secure Hash Algorithm (SHA256) is used to generate the unique key. In practice, a secure key is derived using other suitable means, e.g., including but not limited to Hash Message Authentication Code 256 (HMAC256), etc.

Based on the authentication parameters, a SEV to be encoded into the CAVV/AAV is selected, and a Pre-ATN is created. The Pre-ATN is suitably a random three digit number combined with the SEV to form a four digit number. Alternately, the Pre-ATN is not entirely random but rather conforms to a predetermined sequence or is otherwise determined. Then, FPE is performed using the Pre-ATN and the PAN unique key to generate the encoded and encrypted ATN.

Finally, the ATN and selected key index are passed into the CAVV/AAV calculation. The same index key used for FPE is also used for the key selection used in calculating the CVV in the CAVV/AAV.

Figure 4:
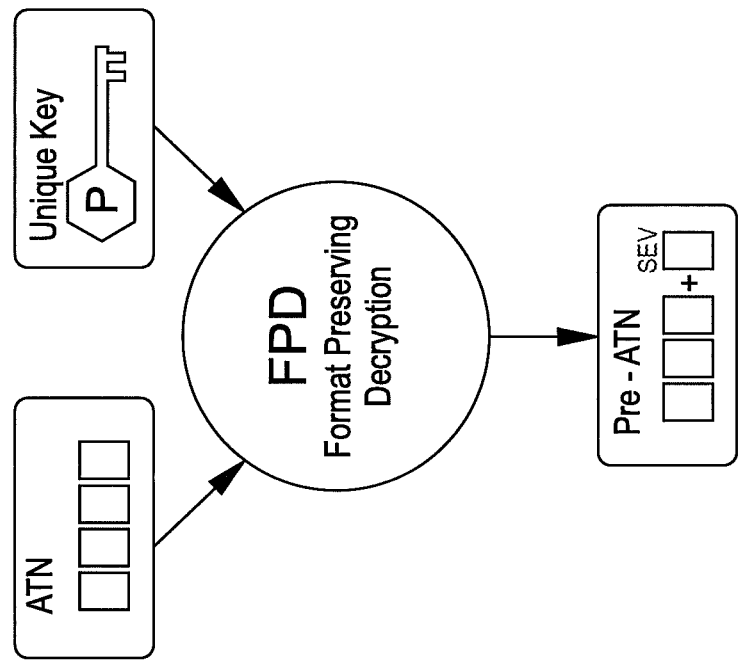
FIG. 4 is a diagrammatic illustration showing an exemplary decoding and decryption method according to an exemplary embodiment of the present inventive subject matter.

With reference now to FIG. 4, there is illustrated an exemplary embodiment by which step B is carried out. As shown, the issuer and decoding entity (e.g., the UPM) are provisioned with appropriate FPE keys, key indexes and SEV definition tables that are suitably maintained in synchronization using a sure methodology. The SEV definition tables relate particular SEV values to specific definitions, e.g., information that is being bridged between the authentication and authorization steps. Initially, a key index is selected, e.g., key index #1. This key index is used for both FPE and CVV calculation. This allows for seamless key rotation.

The FPE base key corresponding to the selected key index is used along with the PAN (or other suitable data) to create a unique key per PAN. For example, as shown, a 256-bit Secure Hash Algorithm (SHA256) is used to generate the unique key. Then, FPD (Format Preserving Decryption) is performed using the ATN and the PAN unique key to generate the Pre-ATN, including the SEV. In this way, the SEV has been communicated to the issuer. Accordingly, the issuer can use the SEV to lookup the corresponding definition in the table. Notably, the SEV and/or its meaning remains opaque, e.g., to other entities handling data and/or messages along the rails.

Various aspects of the present inventive subject matter have been described herein with reference to exemplary and/or preferred embodiments. Obviously, modifications and alterations will occur to others upon reading and understanding the preceding detailed description. It is intended that the inventive subject matter be construed as including all such modifications and alterations insofar as they come within the scope of the appended claims or the equivalents thereof.

The above methods, system, platforms, modules, processes, algorithms and/or apparatus have been described with respect to particular embodiments. It is to be appreciated, however, that certain modifications and/or alteration are also contemplated. Moreover, certain nomenclature has been used herein with reference to various massages, information and/or data (e.g., without limitation, PARes, PAReq, VERes, VEReq, etc.). Such nomenclature is merely used herein for purposes of illustration and/or example, and in practice, other like messages, information and/or data are contemplated regardless of the name or label applied thereto so long as it otherwise functions and/or represents its object similarly.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, various modules, components and/or elements may be embodied by processors, electrical circuits, computers and/or other electronic data processing devices that are configured and/or otherwise provisioned to perform one or more of the tasks, steps, processes, methods and/or functions described herein. For example, a processor, computer or other electronic data processing device embodying a particular element may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the inventive subject matter be construed as including all such modifications and alterations insofar as they come within the scope of the appended claims or the equivalents thereof.

What is claimed is:

1. A system for electronic communication, comprising:
an issuer access control server (ACS) operated by an issuer;
one or more processors of a decoding entity;
one or more processors of an encoding entity; and
an electronic data processing device of the issuer;
wherein the issuer ACS is programmed or configured to:
during an online payment transaction between a merchant and a consumer, perform an authentication procedure to authenticate the consumer associated with a primary account number (PAN) involved in the online payment transaction, wherein when performing the authentication procedure to authenticate the consumer associated with the PAN, the issuer ACS is programmed or configured to:
exchange, with the consumer associated with the PAN, authentication credentials; and
wherein the one or more processors of the encoding entity are programmed or configured to:
create a Pre-Authentication Transaction Number (Pre-ATN), wherein when creating the Pre-ATN, the one or more processors of the encoding entity are programmed or configured to:
select a key index from a plurality of key indexes, wherein the key index corresponds to a Format Preserving Encryption (FPE) base key,
create a unique key that is associated with the PAN that is involved in the online payment transaction, wherein when creating the unique key, the one or more processors of the encoding entity are programmed or configured to:
create the unique key based on the FPE base key and the PAN,
select a Special Encode Value (SEV) from a first SEV definition table based on a definition, wherein the definition comprises information that is being bridged between the authentication procedure that authenticates an identity of the consumer associated with the PAN and an authorization procedure that authorizes the online payment transaction involving the consumer associated with the PAN, and
combine a number with the SEV to create the Pre-ATN, wherein the SEV is a single digit integer value;
encrypt the Pre-ATN using the unique key to generate an encrypted Authentication Transaction Number (ATN); and
send the encrypted ATN and the key index to the issuer ACS to use the encrypted ATN to generate a cardholder Authentication Verification Value (CAVV) or an Accountholder Authentication Value (AAV);
wherein the issuer ACS is programmed or configured to:
generate the CAVV or the AAV based on the encrypted ATN and the key index;
send the CAVV or the AAV to the one or more processors of the decoding entity;
wherein the one or more processors of the decoding entity are programmed or configured to:
obtain the unique key;
obtain the SEV as part of the authorization procedure associated with the online payment transaction, wherein when obtaining the SEV, the one or more processors of the decoding entity are programmed or configured to:
receive, from the issuer ACS, an authorization request for the online payment transaction including the CAVV or the AAV,
deconstruct the encrypted ATN and a key index from the CAVV or AAV, and
decrypt the encrypted ATN using a Format Preserving Decryption (FPD) routine and the unique key, wherein, when decrypting the encrypted ATN using the FPD routine, the one or more processors of the decoding entity are programmed or configured to:
perform the FPD routine using the encrypted ATN and the unique key associated with the PAN to generate the Pre-ATN including the SEV; and
use a second SEV definition table to determine the information that is being bridged between the authentication procedure that authenticates the identity of the consumer associated with the PAN and the authorization procedure that authorizes the online payment transaction involving the consumer associated with the PAN wherein, when using the second SEV definition table to determine the information that is being bridged between the authentication procedure that authenticates the identity of the consumer associated with the PAN and the authorization procedure that authorizes the online payment transaction involving the consumer associated with the PAN, the one or more processors of the decoding entity are programmed or configured to:
use the SEV to look up a corresponding definition in the second SEV definition table, wherein the corresponding definition comprises the information that is being bridged between the authentication procedure that authenticates an identity of the consumer associated with the PAN and the authorization procedure that authorizes the online payment transaction involving the consumer associated with the PAN;
transmit the information that is being bridged between the authentication procedure that authenticates the identity of the consumer associated with the PAN and the authorization procedure that authorizes the online payment transaction involving the consumer associated with the PAN to the electronic data processing device of the issuer; and
wherein the electronic data processing device of the issuer is programmed or configured to:
use the information that is being bridged between the authentication procedure that authenticates an identity of the consumer associated with the PAN and the authorization procedure that authorizes the online payment transaction involving the consumer associated with the PAN to make a decision to authorize the online payment transaction involving the consumer associated with the PAN.

2. The system of claim 1, wherein:
the issuer ACS is provisioned with FPE keys, the plurality of key indexes, and the first and second SEV definition tables; and
the issuer ACS is configured to use the key index of the plurality of key indexes for both FPE and a card verification value (CVV) calculation.

3. The system of claim 1, wherein:
the issuer ACS is provisioned with FPE keys, the plurality of key indexes, and the first and second SEV definition tables.

4. The system of claim 1, wherein the number is a random three digit number.

5. A method for electronic communication, comprising:
during an online payment transaction between a merchant and a consumer, performing, with an issuer access control server (ACS) operated by an issuer, an authentication procedure to authenticate the consumer associated with a Primary Account Number (PAN) involved in the online payment transaction, wherein performing the authentication procedure to authenticate the consumer associated with the PAN comprises:
exchanging, with the consumer associated with the PAN, authentication credentials; and
selecting, with one or more processors of an encoding entity, a key index from a plurality of key indexes, wherein the key index corresponds to a Format Preserving Encryption (FPE) base key;
creating, with the one or more processors of the encoding entity, a unique key that is associated with the PAN that is involved in the online payment transaction, wherein creating the unique key comprises:
creating the unique key based on the FPE base key and the PAN;
selecting, with the one or more processors of the encoding entity, a Special Encode Value (SEV) from a first SEV definition table based on a definition, wherein the definition comprises information that is being bridged between the authentication procedure that authenticates an identity of the consumer associated with the PAN and an authorization procedure that authorizes the online payment transaction involving the consumer associated with the PAN;
creating, with the one or more processors of the encoding entity, a Pre-Authentication Transaction Number (Pre-ATN) by combining a number with the SEV, wherein the SEV is a single digit integer value;
encrypting, with the one or more processors of the encoding entity, the Pre-ATN using the unique key to generate an encrypted Authentication Transaction Number (ATN); and
sending, with the one or more processors of the encoding entity, the encrypted ATN and the key index to the issuer ACS;
generating, with the issuer ACS, a cardholder Authentication Verification Value (CAVV) or a Accountholder Authentication Value (AAV) based on the encrypted ATN and the key index;
sending, with the issuer ACS, the CACC or the AAV to one or more processors of a decoding entity;
obtaining, with the one or more processors of the decoding entity, the unique key;
obtaining, with the one or more processors of the decoding entity, the SEV as part of the authorization procedure associated with the online payment transaction, wherein obtaining the SEV comprises:
receiving an authorization request for the online payment transaction including the CAVV or the AAV from the issuer ACS,
deconstructing the encrypted ATN and a key index from the CAVV or AAV, and
decrypting the encrypted ATN using a Format Preserving Decryption FPD routine and the unique key, wherein decrypting the encrypted ATN using the FPD routine comprises:
performing the FPD routine using the encrypted ATN and the unique key to generate the Pre-ATN including the SEV;
using, with the one or more processors of the decoding entity, a second SEV definition table to determine the information that is being bridged between the authentication procedure that authenticates the identity of the consumer associated with the PAN and the authorization procedure that authorizes the online payment transaction involving the consumer associated with the PAN, wherein using the second SEV definition table to determine the information that is being bridged between the authentication procedure that authenticates the identity of the consumer associated with the PAN and the authorization procedure that authorizes the online payment transaction involving the consumer associated with the PAN comprises:

using the SEV to look up a corresponding definition in the second SEV definition table;

transmitting, with the one or more processors of the decoding entity, the information that is being bridged between the authentication procedure that authenticates the identity of the consumer associated with the PAN and the authorization procedure that authorizes the online payment transaction involving the consumer associated with the PAN to an electronic data processing device of the issuer; and using, with an electronic data processing device of the issuer, the information that is being bridged between the authentication procedure that authenticates an identity of the consumer associated with the PAN and the authorization procedure that authorizes the online payment transaction involving the consumer associated with the PAN to make a decision to authorize the online payment transaction involving the consumer associated with the PAN.

6. The method of claim 5, wherein:
the issuer ACS is provisioned with FPE keys, key indexes, and SEV definition tables; and
the key index of the key indexes is used for both FPE and a card verification value (CVV) calculation.

7. The method of claim 5, wherein:
the issuer ACS is provisioned with FPE keys, key indexes, and SEV definition tables.

8. The system of claim 1, wherein, when creating the unique key, the one or more processors of the encoding entity are programmed or configured to:
create the unique key based on the FPE base key and the PAN using a 256-bit Secure Hash Algorithm.

9. The method of claim 5, wherein creating the unique key comprises:
creating the unique key based on the FPE base key and the PAN using a 256-bit Secure Hash Algorithm.

\* \* \* \* \*